(12) United States Patent
Jang

(10) Patent No.: US 6,373,523 B1
(45) Date of Patent: *Apr. 16, 2002

(54) CCD CAMERA WITH TWO CCDS HAVING MUTUALLY DIFFERENT COLOR FILTER ARRAYS

(75) Inventor: Ji-Hun Jang, Kyungki-do (KR)

(73) Assignee: Samsung Electronics Co., Ltd., Kyungki-do (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/712,270

(22) Filed: Sep. 11, 1996

(30) Foreign Application Priority Data

Oct. 10, 1995 (KR) ............................................. 95-34695

(51) Int. Cl.⁷ ............................ H04N 9/097; H04N 3/14
(52) U.S. Cl. ......................... 348/273; 348/262; 348/279
(58) Field of Search ............................... 348/337, 262, 348/234, 259, 260, 261, 663, 280, 273, 279, 338

(56) References Cited

U.S. PATENT DOCUMENTS

| | | | | |
|---|---|---|---|---|
| 4,907,074 A | * | 3/1990 | Hashimoto | 348/276 |
| 5,136,370 A | * | 8/1992 | Chi | 358/44 |
| 5,285,271 A | * | 2/1994 | Gennetten | 358/500 |
| 5,323,233 A | * | 6/1994 | Yamagami et al. | 348/280 |
| 5,349,381 A | * | 9/1994 | Murayama | 348/252 |
| 5,418,564 A | * | 5/1995 | Aoki et al. | 348/264 |
| 5,583,569 A | * | 12/1996 | Kuzma | 348/237 |
| 5,657,082 A | * | 8/1997 | Harada et al. | 348/262 |
| 5,726,709 A | * | 3/1998 | Kinoshita | 348/338 |
| 5,818,521 A | * | 10/1998 | Hieda | 348/222 |
| 6,078,685 A | * | 6/2000 | Kawai et al. | 382/167 |

* cited by examiner

Primary Examiner—Wendy R. Garber
Assistant Examiner—Rashawn N Tillery
(74) Attorney, Agent, or Firm—Sughrue Mion, PLLC

(57) ABSTRACT

A CCD (charge coupled device) camera system capable of a multi-media response includes: a prism which disperses according to frequency optical signals of an object focused on the prism by a lens; first and second CCDs for converting optical signals which are imaged by the prism into electrical signals, and having mutually different color filter arrays consisting of a complementary color stripe pattern and an effective number of pixels corresponding to the international standard; first and second sample and hold circuits for removing noise from the output video signals of the first and second CCDs; first and second analog to digital converters for converting the analog video signals of the first and second sample and hold circuits into digital signals; and a CCD video signal processor for calculating the sum of and the difference between the two sets of signals output by the first and second sample and hold circuits so as to generate brightness signals and color signals. In order that the system not require a frequency conversion when interfacing with a digital processor, the aspect ratio of the CCD corresponds to the international standard, and the two CCDs have a complementary color stripe pattern, enabling improvement in the horizontal resolution of the brightness signals and the vertical resolution of the color signals.

6 Claims, 4 Drawing Sheets

CCD CAMERA WITH TWO CCDS HAVING MUTUALLY DIFFERENT COLOR FILTER ARRAYS

BACKGROUND OF THE INVENTION (1) Field of the Invention

The present invention relates to a CCD (charge coupled device) camera system which is capable of a multi-media response. More specifically, the CCD camera system has two CCDs which have an aspect ratio corresponding to an international standard, to S thereby avoid the necessity of frequency conversion when interfacing with a digital signal processor. The CCDs also have complimentary stripe patterns to improve the horizontal resolution of the brightness signals and the vertical resolution of the color signals.

(2) Description of the Prior Art

The conventional CCD camera system will be described with reference to the attached drawings.

FIG. 1 is a block diagram showing the constitution of the conventional CCD camera system.

As shown in FIG. 1, the conventional CCD camera system includes:

a lens part 10 for focusing the optical signals of an object;

a CCD 11 for converting the imaged optical signals into electrical signals, when the optical signals from the lens part 10 is imaged;

a sampling/holding device 12 for carrying out a sampling/holding function, so as to remove unnecessary signals such as noise and the like from among the output video signals of the CCD 11;

an analog-digital converter 13 for converting the output analog video signals of the sampling/holding device 12 into digital video signals, so as to carry out a digital signal processing;

a first line memory 14 for storing the one period (1H) delayed output signals of the analog-digital converter 13;

a second line memory 15 for storing the one period (1H) delayed signals of the first line memory 14;

a brightness signal generator 16 for generating brightness signals Y by using the stored signals of the first line memory 14; and a color signal generator 17 for generating color signals Cr and Cb by utilizing an internal color difference signal matrix and by receiving the output signals of the analog-digital converter 13 and the stored signals of the first and second line memories 14 and 15.

The conventional CCD camera constituted as described above operates in the following manner.

In processing color signals by using a single plate type CCD, if the color is to be restored, independent color components have to be provided rather than just color components from a tingle pixel. Recently, among methods using a single plate CCD, a complementary filtering method (a filtering method using the color components of magenta Mg, cyan Cy, yellow Ye, green G) has been used because of its superior spectrum sensitivity characteristics.

The color filter array pattern of the single plate type CCD is constituted such that, horizontally, there are repeatedly arranged lines S1 having components "magenta+cyan" and "green+cyan", and lines S2 having components "green+yellow" and "magenta+yellow". Vertically, if it is assumed that the components "magenta+cyan" and "green+yellow" are Nth line pixels, then the components "green+cyan" and "magenta+yellow" are (N−1)th or (N+1)th line pixels.

The single plate CCD is further broken down vertically into odd fields and even fields, and the pixel components of the lines S1 and S2 are different according to their respective fields.

As described above, the color filter array of the CCD has a sequential structure for each pixel and for each line, and therefore, if the color signals of red R, green G and blue B are to be generated, horizontal and vertical interpolation processes have to be carried out by utilizing the adjacent pixels of the color filter array. Particularly, if the vertical interpolation is to be carried out, the two line memories 14 and 15 of FIG. 1 are used, so as to store the signals of the currently inputted video signals which are delayed by one period (1H) and which are delayed by two periods (2H). Then, based on the signals delayed by one period, an interpolation is carried out by using the currently inputted video signals and the signals delayed by two periods (2H).

In other words, as shown in FIG. 1, the output signals of the CCD 11 are quantized through the sampling/holding device 12 and through the analog-digital converter 13. The quantized signals of the CCD 11 come to have a simultaneity in three lines through the two line memories 14 and 15, with the result that color signals are generated through the horizontal and vertical interpolations.

This single plate type CCD signal processing method is effective in reducing costs. However, because both brightness signals and color signals are produced in the single plate type CCD, a single pixel is not capable of independently generating video signals. Rather, to generate video signals, it is necessary to interpolate different color information of horizontally and vertically adjacent pixels, respectively. Consequently, the resolution for the brightness signals and color signals is reduced, and the picture quality is lowered. As described above, in the conventional camera system, the signals are processed by using the CCD of a complementary pattern. However, this cannot satisfy the resolution of the CCIR 601 format which has 720 lateral pixels and 480 longitudinal pixels, which is the international resolution standard.

Further, the conventional CCD camera system is designed such that it can be applied to the existing analog signal processing system. Therefore, the aspect ratio of the CCD has been used for normal or a high band (H18). The normal type includes 250 thousand effective pixels and has a sampling frequency fs of 9.545 MHz. The high band type includes 380 thousand effective pixels and has a sampling frequency fs of 14.3 MHz.

The sampling frequency fs has no significance in an analog system. However, inasmuch as video signal processing is generally moving toward digital signal processing, the sampling frequency has become an important consideration and the lateral and longitudinal sizes of the video signals to be processed have been adapted to the international standard (lateral:longitudinal=4:3). That is, the frequency of the conventional CCD is incompatible with the international standard (fs: 13.5 MHz) which has been specified for digital video signals. Therefore; it is a disadvantage that a frequency conversion has to be carried out to achieve an interface between the conventional analog system and a system incorporating digital signal processing.

SUMMARY OF THE INVENTION

The present invention is intended to overcome the above described disadvantages of the conventional technique.

Therefore it is a first object of the present invention to provide a CCD camera system capable of a multi-media response, in which the CCD system is constructed by utilizing a CCD having an aspect ratio suitable to the international signal processing standard, i.e., a CCD having an effective pixel region compatible with the international standard, so that it is possible to even digitally process the image without performing a frequency conversion.

Further, the present invention is intended to overcome the problems of deterioration of the resolution of the brightness signals and the degradation of the picture quality of the color signals when using the conventional single plate type CCD of the complementary pattern.

Therefore, it is a second object of the present invention to provide a CCD camera system capable of a multi-media response having two CCDs which utilize the adjacent pixels having different color information and which therefore requires no horizontal and vertical interpolations. That is, a CCD having a striped pattern is formed to enable processing without using two line memories, and to enable the horizontal resolution of the brightness signals to attain the international standard (CCIR 601 format), thereby improving the vertical resolution of the color signals and improving the color regeneration.

In achieving the above objects, the CCD camera system capable of a multi-media response according to the present invention includes:

a prism means for splitting the focused optical signals of said lens;

part into a first beam and a second beam signals of the lens part in accordance with the frequency;

first and second CCDs for respectively converting imaged optical signals into electrical signals after the optical signals are split into two beams by the prism means, and having mutually different color filter arrays consisting of a complementary color stripe pattern and an effective number of pixels corresponding to the international standard;

first and second sampling/holding means for carrying out sampling and holding functions to remove unnecessary signals such as noises from the output video signals of the first and second CCDs;

first and second analog-digital converting means for converting the output analog video signals of the first and second sampling/holding means into digital signals for carrying out a digital signal processing; and a CCD video signal processing means for receiving the output signals of the first and second analog-digital converting means to calculate the sum of and the difference between the two sets of signals so as to generate brightness signals and color signals.

The CCD video signal processing means includes:

a first arithmetic means for adding up respective output signals of the first and second analog-digital converting means;

a second arithmetic means for subtracting respective output signals of the first and second analog-digital converting means;

a brightness signal generating means for receiving output signals of the first arithmetic means to generate brightness signals; and a color signal generating means for receiving output signals of the first and second arithmetic means to generate color signals by utilizing an internal color difference signal matrix.

The format of effective pixels of the first and second CCDs is based on the international standard CCIR 601 (incorporating 720 lateral pixels and 480 longitudinal pixels).

The color filter array (CFA) of the first CCD consists of horizontal repetitions of lines S1 having pixels of "magenta+ cyan" components, and lines S2 having pixels of "green+ cyan" components.

The color filter array of the second CCD consists of horizontal repetitions of lines S1 having pixels of "green+ yellow" components, and lines S2 having pixels of "magenta+yellow" components.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

The preferred embodiment of the present invention will be described in detail referring to the attached drawings in such a manner that those ordinarily skilled in the art can easily carry out the present invention.

Figure 1:
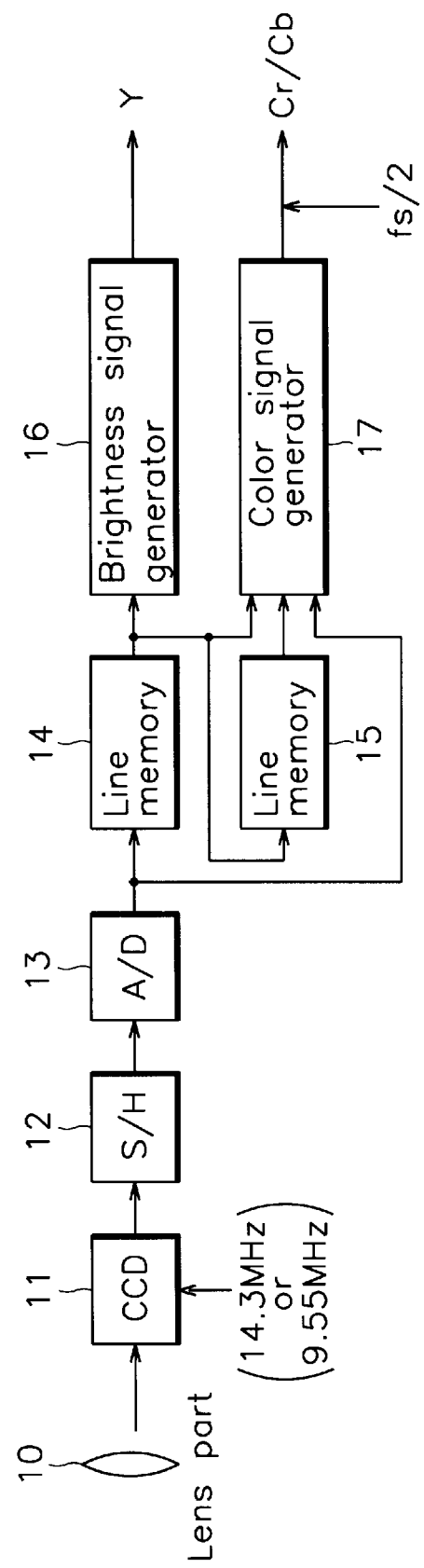
FIG. 1 is a block diagram showing the constitution of the conventional CCD camera system.
Figure 2:
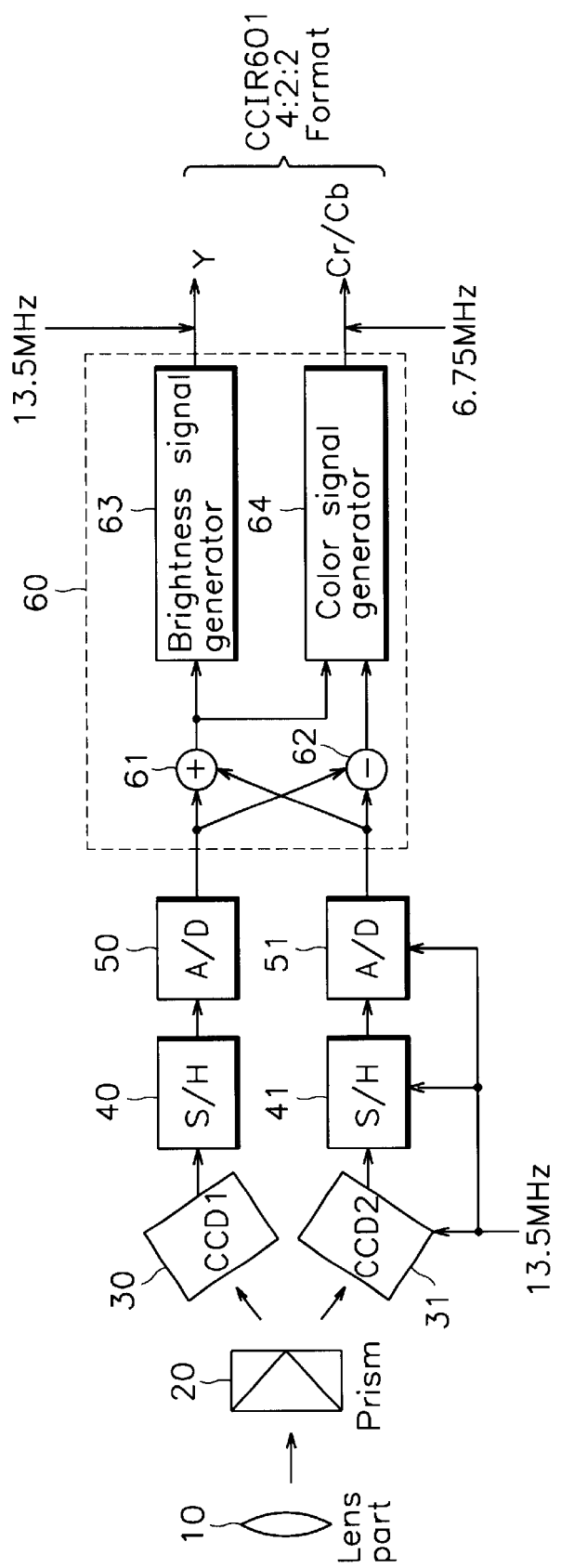
FIG. 2 is a block diagram showing the constitution of the CCD camera system capable of a multi-media response according to the present invention.

FIG. 2 is a block diagram showing the constitution of the CCD camera system capable of a multi-media response according to the present invention.

Figure 3:
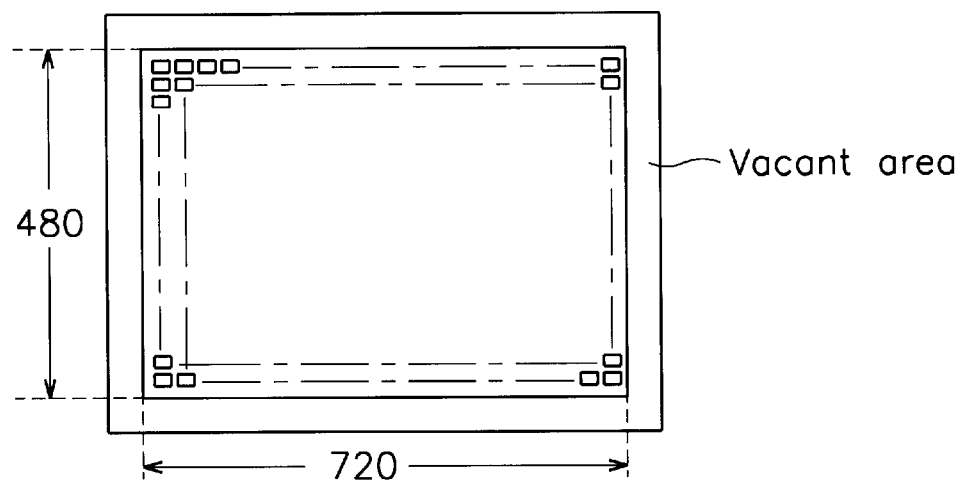
FIG. 3 is an example of the standard of the CCD effective pixels proposed by the present invention.

FIG. 3 is an example of the format of the CCD effective pixels proposed by the present invention.

Figure 4A:
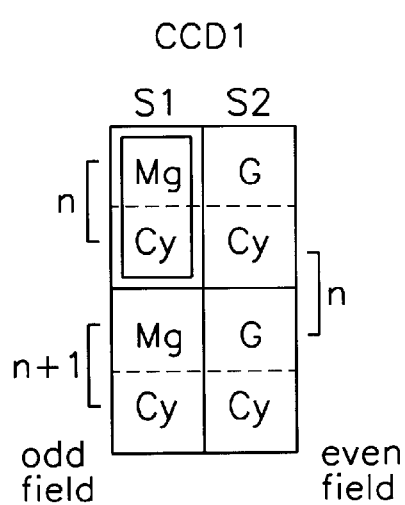
FIGS. 4A and 4B are examples of the CCD color filter array proposed by the present invention.
Figure 4B:
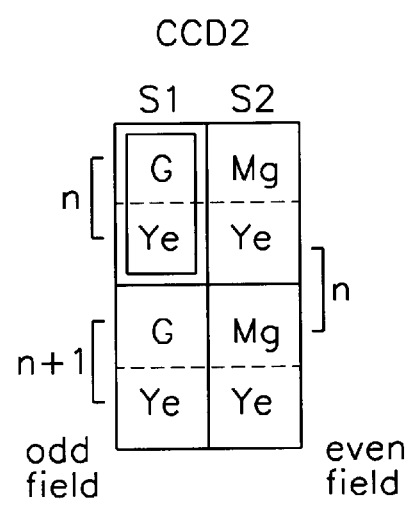

FIGS. 4A and 4B are examples of the CCD color filter array proposed by the present invention.

As shown in FIG. 2, the CCD camera system capable of a multi-media response according to the present invention includes:

a lens part 10 for focusing the optical signals of an object;

a bidirectional prism 20 for splitting the focused optical signals of the lens part 10 into two beams;

CCDs 30 and 31 for converting imaged optical signals into electrical signals after the split optical signals are imaged by the bidirectional prism 20, and having mutually different color filters consisting of a complementary color stripe pattern and an effective number of pixels corresponding to the international standard;

sampling/holding devices 40 and 41 for carrying out sampling and holding functions to remove unnecessary signals such as noises from the output video signals of the CCDs 30 and 31;

analog-digital converters 50 and 51 for converting the output analog video signals of the sampling/holding devices 40 and 41 into digital signals for carrying out a digital signal processing; and a CCD video signal processor 60 for receiving the output signals of the analog-digital converters 50 and 51 to calculate the sum of and the difference between the two sets of signals so as to generate brightness signals and color signals.

The CCD video signal processor 60 includes:

an adder 61 for adding together respective output signals of the analog-digital converters 50 and 51;

a subtractor 62 for subtracting respective output signals of the analog-digital converters 50 and 51;

a brightness signal generator 63 for receiving output signals of the adder 61 to generate brightness signals; and a color signal generator 64 for receiving output signals of the adder and subtractor 61 and 62 to generate color signals by utilizing an internal color difference signal matrix.

The format of the effective pixels of the CCDs 30 and 31 is based on the format which is used in the international standard CCIR 601 in which there are 720 lateral pixels and 480 longitudinal pixels.

The color filter array (CFA) of the CCD 30 consists of horizontal repetitions of lines S1 having pixels of "magenta+cyan" (Mg+Cy) components, and lines S2 having pixels of "green+cyan" (G+Cy) components.

The color filter array of the CCD 31 consists of horizontal repetitions of lines S1 having pixels of "green+yellow" (G+Ye) components, and lines S2 having pixels of "magenta+yellow" (Mg+Ye) components.

The CCD camera system of the present invention constituted as described above operates in the following manner.

As shown in FIG. 2, the light rays of an object which are inputted through the lens part 10 are refracted by the bidirectional prism 20, so that the light rays are irradiated to the two CCDs 30 and 31 having different color filter arrays. FIGS. 4a and 4b illustrate the color filter array pattern of the two CCDs 30 and 31. As shown in FIGS. 4a and 4b, the color filter array patterns of the two CCDs 30 and 31 are constituted such the addition of electrical signals from two corresponding pixels of CCDs 30 and 31, e.g., the addition of a pixel of (Mg+Cy) components and a pixel of (G+Ye) components, yield a brightness signal. By utilizing the sum and the difference of the two pixels, color signals (R, G, B) are generated.

Now the principle of the brightness signals and color signals in the CCD camera system according to the present invention will be described.

First, the sum of the first pixels is the sum of the (Mg+Cy) pixel of the CCD 30 and the (G+Ye) pixel of the CCD 31, and therefore, a calculation shows that (2R+3G+2B) can be used as brightness signals. In the same way, the sum of the pixels of the second horizontal line is the sum of the (G+Cy) pixel and the (Mg+Ye) pixel, and therefore, a calculation shows that (2R+3G+2B) is produced, giving the same result as above. It is apparent that, unlike the conventional signal processing in which the average values of the horizontally adjacent pixels are used to generate brightness signals, the brightness signals are generated independently at each pixel in the present invention.

Then, the difference component of the first pixels becomes (G+Ye)−(Mg+Cy)=(2R−G). In the same manner, the difference of the second pixels can be calculated to be (Mg+Ye) (G+Cy)=(G−2B). Therefore, by forming a color difference matrix by utilizing the sum and difference components of the respective pixels, the primary colors of red, green and blue can be generated. Further, the pixels of the next line have the same components, and therefore, the difference component gives the same result. This means that the 3-line interpolation which has to be carried out in the conventional single plate type CCD for generating the color signals is not carried out in the present invention, but the data of red and blue can be obtained from each line.

In order to assist the understanding of the CCD signal processing method, an example of a matrix will be given in which red, green and blue are generated. GREEN=(2R+3G+2B)−{(2R−G)−(G−2B)} =5G RED=(2R−G)+0.2×GREEN= 2R BLUE=(G−2B)+0.2×GREEN=2B Further, FIG. 3 illustrates the format of the CCD effective pixels in the CCD camera system capable of a multi-media response according to the present invention.

As shown in FIG. 3, the aspect ratio is set such that the lateral and longitudinal size is suitable for the effective pixel size of 720×480 of International Standard CCIR 601. Thus interfacing with other digital video systems and applied systems is rendered easier. Under this condition, the CCD sampling frequency or the horizontal driving signal frequency is 13.5 MHz.

The output signals of the two CCDs 30 and 31, which are outputted with the sampling frequency of 13.5 MHz, pass respectively through the two sampling/holding devices 40 and 41, and through the analog-digital converters 50 and 51, to be inputted into the CCD video signal processor 60. Further, as described above, in order to generate the brightness signals and the color signals, the sum and difference of the two sets of the quantized signals which are inputted into the CCD video signal processor 60 are inputted into the brightness signal generator 63 and into the color difference signal generator 64.

The subsequent signal processing process is the same as that of the conventional method except that the system frequency used in the signal processing is 13.5 MHz, which is compatible with the international standard.

Here, if the CCD camera system of the present invention is viewed as a brightness signal and color signal generator, it may be said that the frequency is simply changed. However, considering the fact that the CCD standard is changed, and that, at the subsequent stages, it corresponds to the CCIR 601 format, the present invention has much significance.

Figure 5:
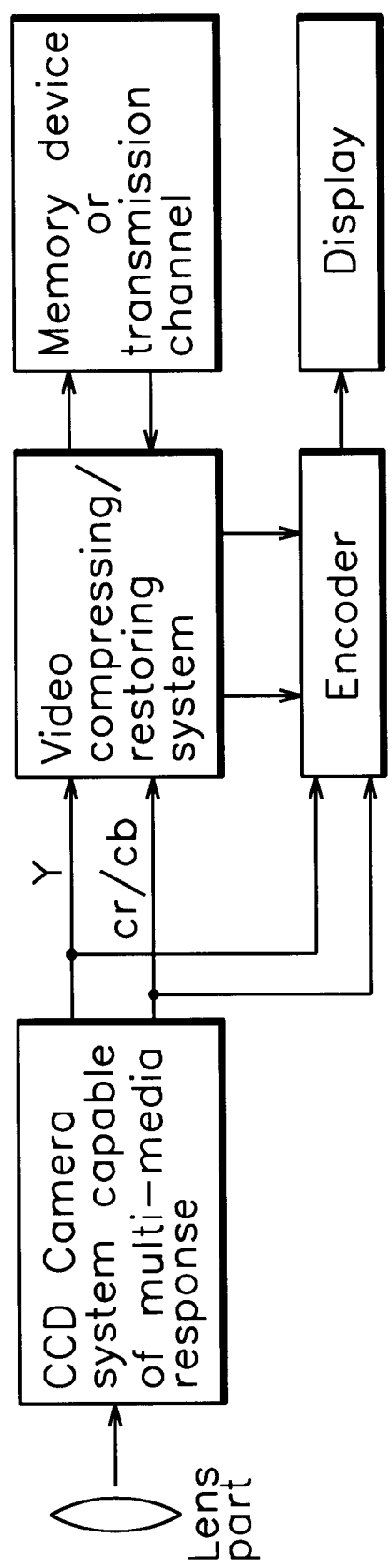
FIG. 5 illustrates an application of the CCD camera system capable of a multi-media response according to the present invention.

FIG. 5 illustrates an application of the CCD camera system capable of a multi-media response according to the present invention.

As shown in FIG. 5, the output of the CCD camera system according to the present invention is the brightness signals Y and the color difference signals Cr/Cb. These signals undergo a video compressing procedure through a video compressing/restoring system so as to be transmitted and recorded to memories and transmission channels. The signals which are transmitted and recorded to the memories or transmission channels undergo again a video restoring process through a video compressing/restoring system, so as to be converted to the CCIR 601 4:2:2 (=Y:Cr:Cb) format. Then the signals pass through an encoding process so as to be converted to composite video signals corresponding to the video signal standard, and then the signals are displayed on the screen. The device of the present invention is expected to be applied to all systems using a camera in the coming multi-media era.

According to the present invention as described above, in order to constitute the system without requiring a frequency conversion when interfacing with a digital processing apparatus, the aspect ratio of the CCD is provided to correspond with the international standard, and the system uses two CCDs of a complementary color stripe pattern, thereby improving the horizontal resolution of the brightness signals and the vertical resolution of the color signals.

What is claimed is:

1. A CCD camera system capable of a multi-media response, comprising:

a lens part for focusing optical signals of an object;

a prism means for splitting the focused optical signals of said lens part into a first beam and a second beam;

first and second CCDs for respectively converting the first and second beams into electrical signals, and having mutually different color filter arrays consisting of a complementary color stripe pattern and an effective number of pixels corresponding to an international standard;

first and second sampling/holding means for carrying out sampling and holding functions to remove unnecessary signals such as noises from the output video signals of said first and second CCDs and outputting analog video signals;

first and second analog-digital converting means for converting the analog video signals output by said first and second sampling/holding means into respective digital signals for carrying out digital signal processing; and a CCD video signal processing means for directly receiving the digital signals output by said first and second analog-digital converting means and calculating a sum of and a difference between the digital signal output by said first analog-digital converting means and the digital signal output by said second analog-digital converting means so as to generate brightness signals and color signals, wherein said CCD video signal processing means common since a first arithmetic means for adding the respective digital signals output by said first and second analog-digital converting means and outputting a corresponding signal;

a second arithmetic means for subtracting the respective digital signals output by said first and second analog-digital converting means and outputting a corresponding signal:

a brightness signal generating means for receiving the signal output by said first arithmetic means to generate a brightness signal; and a color signal generating means for receiving the signals output by said first and second arithmetic means to generate color signals by utilizing an internal color difference signal matrix.

2. The CCD camera system as claimed in claim 1, wherein the international standard is CCIR 601 having a format of 720 effective lateral pixels and 480 effective longitudinal pixels.

3. The CCD camera system as claimed in claim 1, wherein the mutually different color arrays of said first and second CCDs are constituted such that a sum of those portions of the digital signals output by said first and second CCDs which are associated with corresponding pixels forms the basis for generation of the brightness signal, and such that the sum of those portions of the digital signals output by said first and second CCDs which are associated with corresponding pixels and a difference between the portions of the digital signals output by said first and second CCDs which are associated with the corresponding pixels form the basis for generation of the color signals (R, G and B).

4. The CCD camera system as claimed in claim 1, wherein a color filter array (CFA) of said first CCD consists of horizontal repetitions of lines S1 having pixels of "magenta+cyan" components, and lines S2 having pixels of "green+cyan" components.

5. The CCD camera system as claimed in claim 1, wherein a color filter array of said second CCD consists of horizontal repetitions of lines S1 having pixels of "green+yellow" components, and lines S2 having pixels of "magenta+yellow" components.

6. The CCD camera system as claimed in claim 1, wherein the sampling frequency of said first and second CCDs is 13.5 MHz in correspondence with the international standard.

* * * * *